US005116448A

United States Patent [19]

Murayama et al.

[11] Patent Number: 5,116,448

[45] Date of Patent: May 26, 1992

[54] SINGLE FACTER CAPABLE OF MAINTAINING A CONSTANT ROLL GAP

[75] Inventors: Kimio Murayama; Yukuharu Seki; Hiroaki Sasashige, all of Hiroshima, Japan

[73] Assignee: Mitsubishi Jukogyo Kabushiki Kaisha, Tokyo, Japan

[21] Appl. No.: 481,026

[22] Filed: Feb. 16, 1990

[30] Foreign Application Priority Data

Feb. 17, 1989 [JP] Japan ............................. 1-16801[U]

[51] Int. Cl.[5] ......................... B31F 1/28; B32B 31/08; G01D 3/04

[52] U.S. Cl. .................................... 156/350; 156/359; 156/378; 156/471; 156/472; 425/170; 425/367

[58] Field of Search ................. 156/64, 350, 359, 361, 156/378, 462, 470, 471, 472, 205, 210, 208; 264/286; 425/170, 367; 493/463

[56] References Cited

U.S. PATENT DOCUMENTS 2,185,884 1/1940 Bruker et al. ........................ 425/367

4,787,835 11/1988 Cavanagh ........................ 425/367 X

FOREIGN PATENT DOCUMENTS 2597404 10/1987 France ................................ 156/470

2189269 10/1987 United Kingdom .

*Primary Examiner*—Michael W. Ball

*Assistant Examiner*—Michele K. Yoder

*Attorney, Agent, or Firm*—Rothwell, Figg, Ernst & Kurz

[57] ABSTRACT

A single facer comprises an apparatus for automatically adjusting a gap between rolls, i.e., an apparatus for maintaining a roll gap constant. The apparatus for adjusting the distance between the centers of the roll shafts is operable to move one roll toward the other by actuating driving means. The driving means is controlled in response to the variation in the temperature of the frame which supports the driving means of the roll in place, or to the passage of time after a heating mechanism for heating the rolls has started operation.

6 Claims, 3 Drawing Sheets

SINGLE FACTER CAPABLE OF MAINTAINING A CONSTANT ROLL GAP

FIELD OF THE INVENTION AND RELATED ART STATEMENT

The present invention relates to a single facer for use in a corrugating machine comprising an apparatus for correcting a distance between the centers of shafts which is adapted to adjust (correct) a contacting condition between a lower roll and other rolls such as a top roll, a press roll and a gluing roll etc., which are in contact with said lower roll.

FIG. 1 conceptionally illustrates a typical single facer which has been used in a traditional corrugating machine. The major components of the single facer are a top roll 1 having teeth 1*a* formed around the circumferential surface thereof and arranged for free rotary movement, a lower roll 2 having teeth 2*a* formed around the circumferential surface thereof and arranged for free rotary movement with teeth 2*a* being engaged with teeth of the top roll 1 so that a corrugating medium 5 may be shaped into a corrugated configuration by urging the medium to enter into a gap formed between teeth 1*a* and 2*a*. A gluing roll 3 is arranged closely adjacent to the teeth 2*a* of the lower roll 2 for rotary movement and is adapted to apply a predetermined quantity of glue over the corrugated top portion of the corrugating medium 5 which has been formed by the rolls 1 and 2, and a press roll 4 etc., arranged to be closely adjacent to or in contact with the teeth 2*a* of the lower roll 2 for rotary movement and is adapted to produce a single faced corrugated board by allowing the corrugating medium 5 with glue applied and a liner board 6 to pass between it and the lower roll 2 under pressure for lamination. Gaps formed between the top roll 1 and the lower roll 2, between the lower roll 2 and the gluing roll 3 and between the lower roll 2 and the press roll 4 are all made to be variable in dimension by means of an apparatus for adjusting the roll contacting pressure (clearance), i.e., an apparatus for adjusting a distance between the centers of roll shafts supporting the rolls.

In such a single facer, suitable pressing forces and heating means for heating of the glue must be provided to laminate the corrugating medium 5 with the liner board 6 by applying glues, and consequently an apparatus for circulating steam to supply heating energy is incorporated in said rolls 1, 2 and 3.

There is a problem as described below in the traditional single facer illustrated in FIG. 1. That is, when a glue is used to laminate the liner board 6 to the corrugating medium 5 which has been formed in a corrugated configuration, a certain heating means is required to heat the starch glue to a flowable state, and hot rolls which have been heated act to elevate the temperature and expand the opposite sides of frame 8 on which the rolls are supported. This results, for example, in the increase of the distance P between the centers of shafts of the lower and press rolls 2 and 4 which are journaled, and consequently a gap amount S also tends to increase with time. Because of these shortcomings, pressing forces of the press roll 4 are gradually reduced, and such reduced pressing forces may result in the production of a single faced corrugated fiberboard 7 with inconsistent thickness and also an imperfectly formed lamination between corrugating medium 5 and the liner board 6 from which the single faced corrugated fiberboard sheet is made, and thus a poor quality corrugated sheet has frequently been made having substantially reduced strength and quality. The problem in the prior art has been described with reference to the lower roll 2 and the press roll 4, but a similar problem of varying distance between the centers of roll shafts may also occur between the top roll 1 and the lower roll 2, or between the lower roll 2 and the gluing roll 3, as the temperature of the frame 8 is elevated, and this has been a significant factor to hinder the improvement of the apparatus toward automation. Therefore, it has been a common practice to check the corrugated fiberboard 7 which is being produced for any abnormality through a visual inspection, and then to manually remove any defect if any. This procedure, however, needs a high level of skills and experience, which hinders automation.

OBJECT AND SUMMARY OF THE INVENTION

It is therefore an object of the present invention to provide a single facer which can maintain a constant gap between rolls by automatically correcting a distance between the centers of roll shafts.

To achieve the above object, the present invention provides a single facer, wherein a top roll, a lower roll, a press roll and a gluing roll are supported on a frame, heating means are provided to heat the top, lower and press rolls, a corrugating medium is passed between the lower roll and the top roll so that it may be shaped to a corrugated configuration, while rolls are being heated, then the corrugating medium is guided to pass between the lower roll and the gluing roll to apply glue over the corrugated top portion of the corrugating medium, and then the corrugating medium is caused to pass between the lower roll together and the press roll with a liner board to bond the corrugating medium with the liner board, said single facer being characterized in that at least one of the top roll, gluing roll and press roll is arranged so as to be movable toward and away from the lower roll, an apparatus for adjusting a distance between the centers of roll shafts is provided between said at least one roll and said lower roll which are arranged for movement toward and away from said lower roll, said apparatus being operable to move the roll which is arranged for movement toward and away from said lower roll by actuating driving means, said frame is provided either with a temperature sensor which senses the temperature of the frame or a sensor which senses the start of the heating operation of the heating means, and furthermore a controller is provided which can actuate said apparatus for correcting the distance between centers of roll shafts in response to detection signals from the sensor.

Thus, the inventors of the present invention have found that the temperature of the frame is increased with time as steams is caused to circulate within each of the rolls, and that there is a certain interrelationship between the temperature of the frame and the gap amount of the lower roll. When the steam valve is opened, the temperature of the frame may increase in a curved fashion with time, and the gap amount between said rolls may also increase proportionally. It is also found that the temperature of the frame may cease increasing further at a predetermined time and therefore the temperature is kept at a constant level, and the gap amount will become steady after the passage of the predetermined time. Such tendency has been substantially common to the same single facer.

Taking the above phenomenon into account, the present invention has been made such that a temperature sensor is utilized to measure the temperature variation of the frame, and an apparatus is driven via a controller for correcting the distance between centers of roll shafts so as to maintain a gap amount at a constant level. Furthermore, because the temperature increase of the frame may be taken as a function of time, a timer is preset so that the apparatus for correcting the distance between the centers of roll shafts may be actuated in response to the clapsing of the preset time, instead of the variation in the frame temperature, and thereby maintaining the gap amount between rolls constant.

As described above, the present invention is constituted such that the variation in the distance between the centers of roll shafts may be detected either as a function of time or by directly measuring the frame temperature, and the apparatus for correcting the distance between the centers of the roll shafts may be controlled in response to such temperature variation or passage of time and thus a precise correction is achievable for the expansion (increase in the gap amount between the lower roll and the press roll and the like). As a result, it is possible to eliminate inconsistent lamination between single faced corrugated fiberboard sheets and the like, providing a remarkable effect in the improvement of the product quality such as thickness, strength and aesthetical appearance etc., moreover, the single facer does not need to be stopped to adjust the contact pressure between rolls, and besides numerous other merits are derived such as an automatic operation.

DETAILED DESCRIPTION OF PREFERRED EMBODIMENTS

Figure 1:
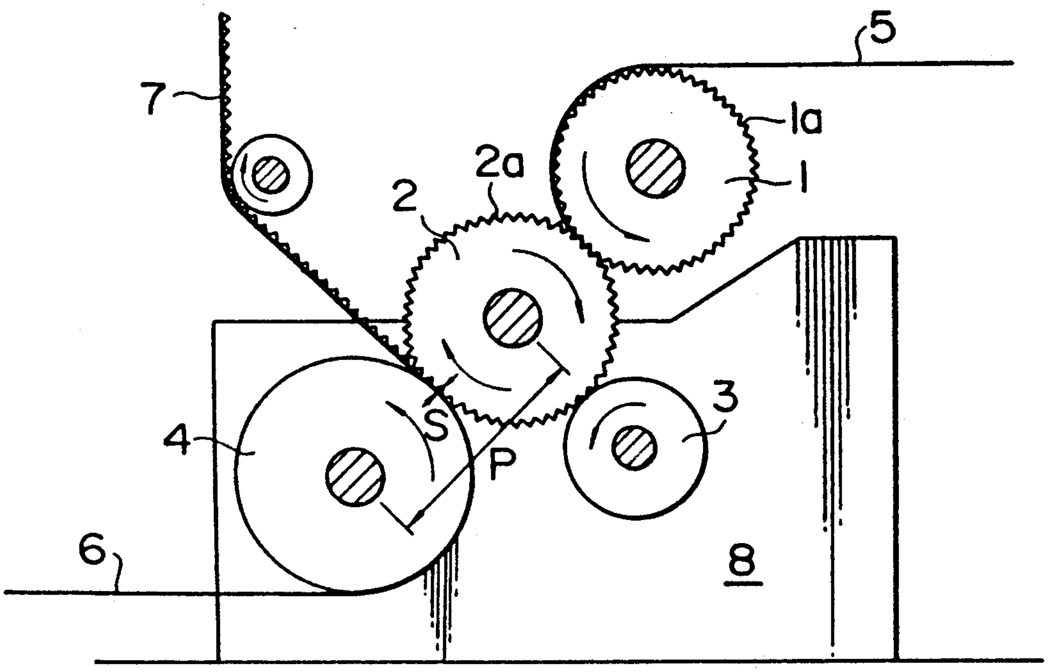
FIG. 1 PRIOR ART
FIG. 1 is a cross-sectional view showing a typical single facer in the prior art.
Figure 2:
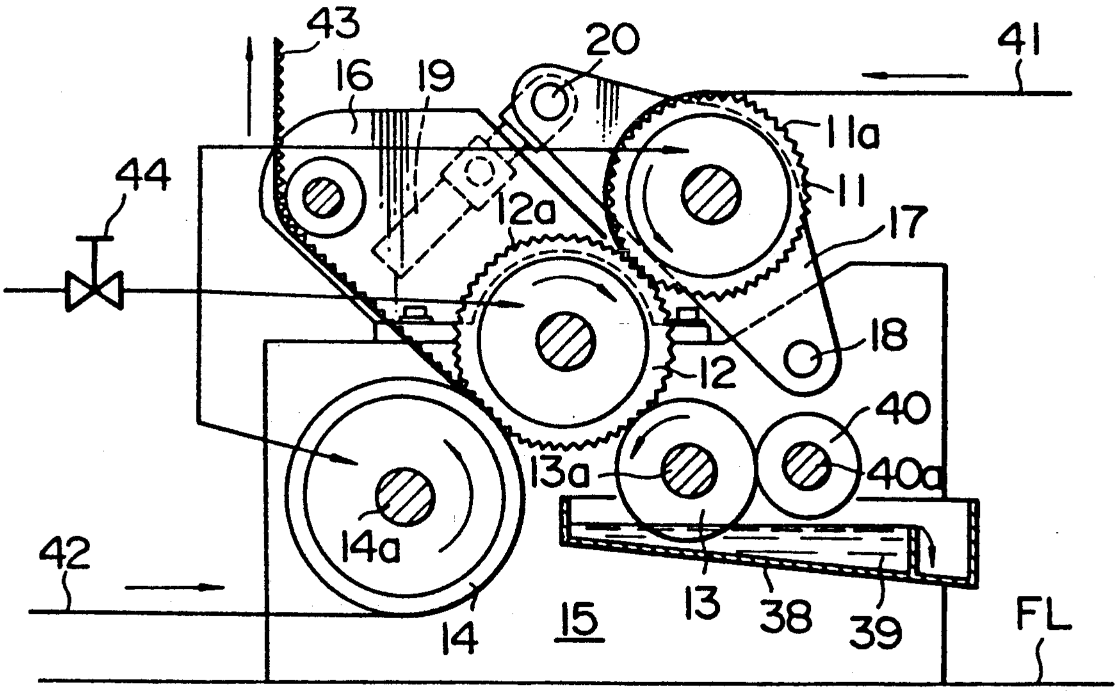
FIG. 2 is a lateral cross-sectional view showing a single facer embodying the concept of the present invention.

A single facer is constituted as shown in FIG. 2 by a top roll 11 having teeth **11*a* formed around the circumfernetial surface, a lower roll 12 having teeth 12*a* formed around the circumferential surface with said teeth 12*a* engaged with teeth 11*a* of the top roll 11, a gluing roll 13 arranged to be closely adjacent to teeth 12*a* of said lower roll 12, and a press roll 14 arranged to be closely adjacent to or in contact with teeth 12*a* of the lower roll 12. The lower roll 12 has its bearings pinched and fastened in place between the frame 15 and the bracket 16. The top roll 11 is supported via bearings (not shown) on an arm 17 one end of which is attached to the frame via a pivot pin 18 for free pivotable movement and an opposite end of which is coupled with the piston rod tip end of a pressure cylinder 19 via a pin 20. The pressure cylinder 19 is supported on the bracket 16 which is in turn fastened to the frame 15. A positioning stop (not shown) is used in conjunction with the cylinder 19 to adjust a contacting pressure (gap) between the two rolls 11 and 12**.

Figure 3:
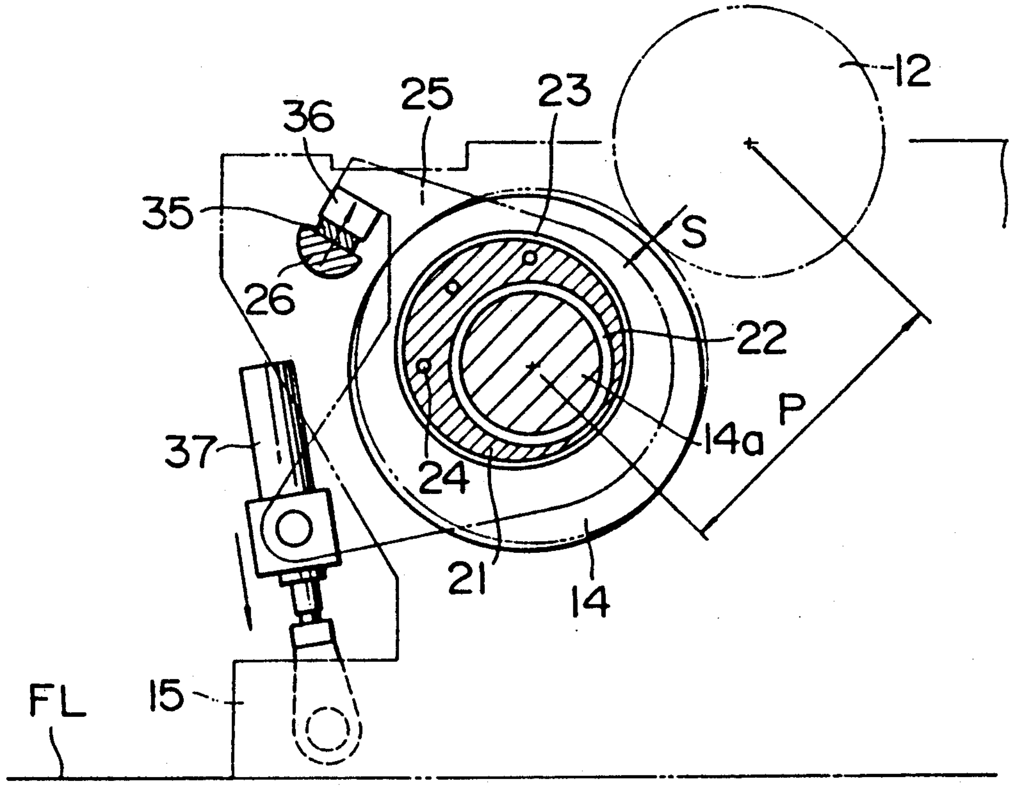
FIG. 3 is a partial cross-sectional view showing a press roll section of the single facer in accordance with the present invention.
Figure 4:
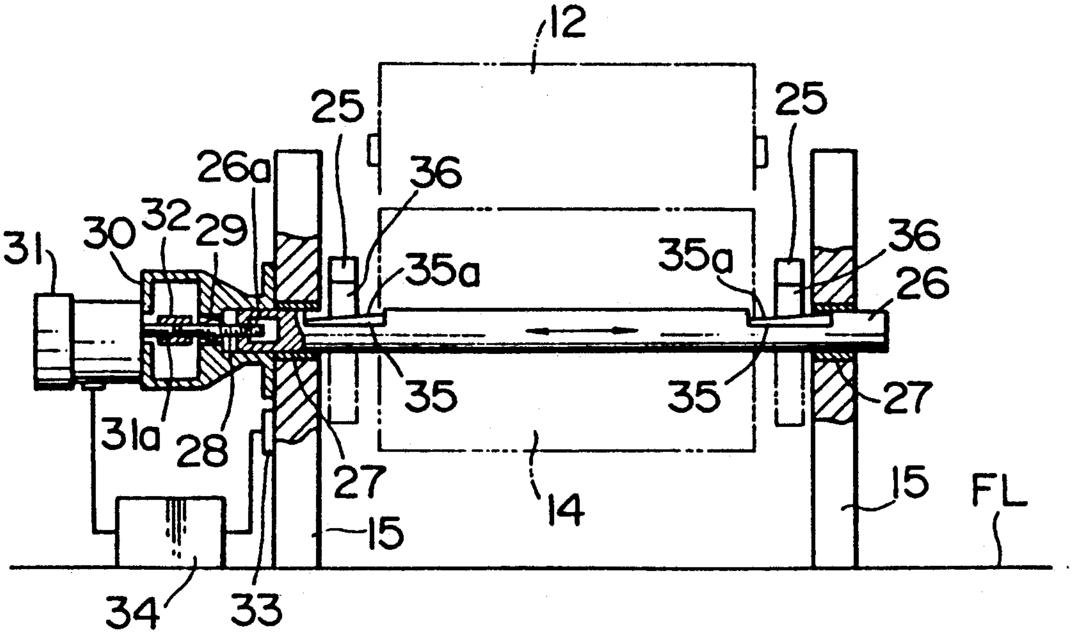
FIG. 4 is a front elevation view showing essential parts of the apparatus for adjusting a distance between the centers of the shafts of the press roll and the lower roll according to the invention.

As shown in FIG. 3, the shaft **14*a* of the press roll 14 is journaled on bearings 22 opposite ends of which are embraced by an eccentric disc or cam 21 which is held on the frame 15 via a bushing 23 for pivotal movement. A press lever 25 is secured via a tapered pin 24 on the eccentric disc 21. An eccentricity adjustment rod 26 is provided to be closely adjacent to one end of the press lever 25. As shown in FIG. 4, the eccentricity adjustment rod 26 has its opposite ends journaled on the frame via a slide bushing 27 for axial slidable movement. Furthermore, a female thread 26*a* is formed on an outside end of the rod 26 and is threadably engaged with a thread rod 28. A portion of the thread rod 28 is journaled on the bracket 30 through bearings 29 and the top end of the rod 28 is directly coupled through a coupling 32 with the shaft 31*a* of the motor 31 which is secured on the bracket 30. The motor 31 is controlled as described below in response to the temperature sensor 33 provided on the frame 15, and is connected with the temperature sensor 33 through the controller 34. An inclined slider 35 is secured in place on the rod 26 at a position corresponding with the bearing section of the press roll 14, and as the rod 26 slides in an axial direction indicated by the double arrow line in FIG. 4, the press lever 25 and the eccentric disc 21 are caused to pivot by means of the slider 36 which is in sliding contact with the inclined surface 35*a* of the slider 35, thereby shifting the position of the center c of the press roll shaft 14*a*. A cylinder 37 for securing the eccentric disc is arranged between an opposite end of the press lever 25 and the frame 15 as shown in FIG. 3. The cylinder 37 biases the press lever 25 towards a counterclockwise direction in FIG. 3. Thus, the slider 36 which is arranged on one end of the press lever 25 is constantly in abutment with the slider 35. The shaft 13*a* of the gluing roll 13 is supported on the frame 15 or an arm and the like via bearings. The gluing roll 13 has its lower portion oriented toward and immersed in a glue 39 in a glue container 38. An adjustment roll 40 is arranged above the glue container 38. The adjustment roll 40 functions to suitably adjust the quantity of glue 39 adhered on the gluing roll 13 surface, and has its shaft 40*a* supported for movement on the frame 15 or an arm and the like via bearings and its circumferential surface in abutment with the gluing roll 13 to scrape away an excess glue 39 adhered on the roll 13**.

In such single facer, a single faced corrugated fiberboard sheet is manufactured in accordance with a process wherein the corrugating medium 41 is urged to enter into a gap between rolls 11 and 12, and formed into a corrugated shape under cooperation between two rolls 11 and 12, then the corrugated medium 41 is guided to pass between rolls 12 and 13, the glue 39 is applied over the top portion of the corrugated medium 41 by means of the roll 13, the corrugated medium 41 and the liner board 42 are overlapped on each other between rolls 12 and 14, and finally the liner board 42 is urged against the corrugated medium 41 by means of the roll 14.

During the course of this process, steam is supplied to rolls 11, 12 and 14 though the valve 44 with the actuation of the single facer, and the steam acts to heat rolls 11, 12 and 14. As these rolls 11, 12 and 14 are elevated in temperature, the heat is transmitted to the frame 15 through the bearings and the like. In this manner, as the temperature of the frame 15 increases, the frame 15 is expanded in response to such heat, and as a result distances P between rolls 11 and 12 and between rolls 12 and 14 increase.

Figure 5:
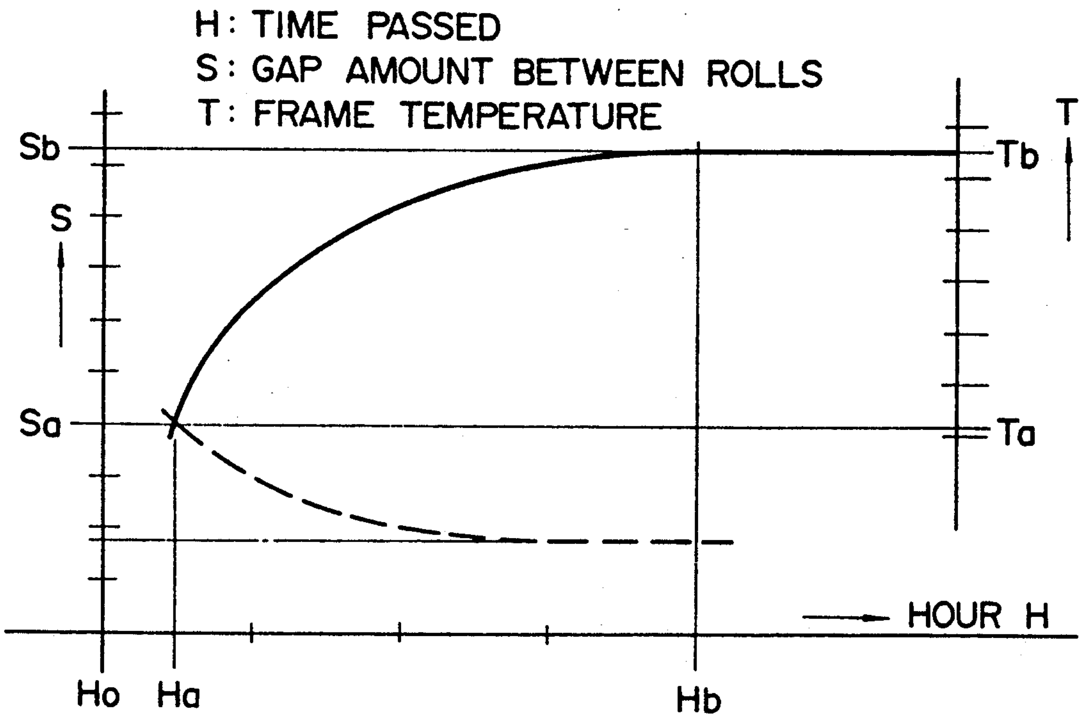
FIG. 5 is a diagrammatic view showing a relationship between the passage of time after steam is caused to circulate in each of the rolls, the gap amount between rolls and the frame temperature.

FIG. 5 shows an interrelationship between the frame temperature T which is variable with the passage of time after steam is caused to circulate in rolls 11, 12 and 14 and the gap amount S between the lower roll 12 and the press roll 14. In this graphical illustration, it is indicated that when the steam valve is opened at the time Ha, the temperature of the frame 15 is increased from Ta to Tb after a predetermined period is expired as shown with a solid line, and proportionally the gap amount between said rolls is increased from Sa to Sb. In the meantime, the temperature increase of the frame 15 reaches its peak value after the predetermined time $H_b$ and then the temperature stops elevating further and thereafter a constant temperature $T_b$ is maintained and the gap amount S between rolls is also maintained constant after the expiration of the predetermined time $H_b$. This tendency is substantially common to the same single facer.

Figure 6:
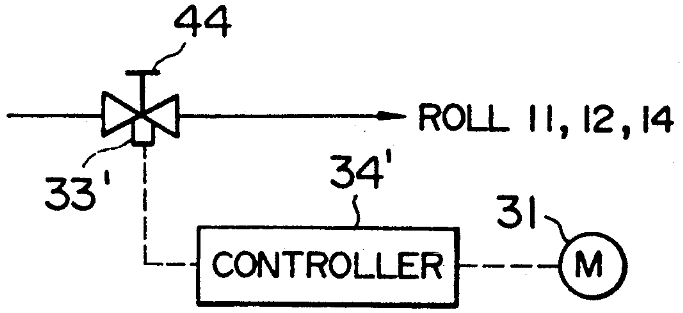
FIG. 6 is a view showing an alternative mode of operation of the apparatus for adjusting the distance between the centers of the roll shafts.

In this above embodiment, the phenomenon is taken into account, and the temperature sensor 33 is used to measure the temperature variation of the frame 15 and then the controller 34 is actuated to drive the motor 31 in accordance with the temperature thus measured, thereby maintaining the gap amount S between rolls 12 and 14 constant. From the graphical illustration in FIG. 5, it is also possible to take the temperature increase of the frame 15 as a function of time from Ha to Hb. Thus, as shown in FIG. 6, the gap amount S between the lower roll 12 and the press roll 14 can be maintained constant by providing the valve 44 with the sensor 33′ adapted to verify the opening of the valve 44, and the output from the sensor 33′ is supplied to the controller 34′ in which the motor 31 is actuated to operate in accordance with the amount which corresponds with the passage of time in FIG. 5.

Meanwhile, the broken line in FIG. 5 is a curve indicating one example of how variations in the gap may be corrected, and such correcting amount may be freely preset through controllers 34 and 34′.

In the embodiment described above, apparatus for correcting the distance between the centers of the roll shafts in accordance with the present invention is provided between the lower roll 12 and the press roll 14, but it is also possible to arrange the same apparatus between the lower roll 12 and the top roll 11 and between the lower roll 12 and the gluing roll 13.

We claim:

1. In a single facer apparatus for forming single-faced corrugated sheets having a top corrugating roll, a lower corrugating roll, a gluing roll and a press roll supported on a frame and passing a sheet medium to be corrugated between said lower corrugating roll and each of said top corrugating roll, said gluing roll and said press roll, and heating means for heating each of said rolls, the improvement comprising:

means for adjusting the distance between centers of support shafts of said lower corrugating roll and least one of said top corrugating roll, said gluing roll and said press roll;

temperature sensor means for detecting the expansion of said frame caused by transfer of heat from said rolls by detecting the temperature of said frame; and means for actuating said means for adjusting in response to the detection of expansion by said temperature sensor means in order to compensate for said expansion of said frame by maintaining the distance between said centers of support shafts constant.

2. A single facer according to claim 1, wherein said means for adjusting comprises:

cam means in contact with a support shaft of at least one of said rolls for adjusting the position of said at least one of said rolls relative to an adjacent roll according to the position angle of said cam means;

lever means for rotating said cam means to a desired angular position; and means for moving said lever means in response to operation of said means for actuating.

3. A single facer according to claim 2, wherein said means for moving comprises an inclined slider mounted to an adjustment rod, said means for actuating comprises a motor operable in response to said temperature sensor means, said adjustment rod being movable in an axial direction by rotation of said motor to cause said inclined slider to engage said lever means and thereby rotate said cam means to said desired angular position.

4. In a single facer apparatus for forming single-faced corrugated sheets having a top corrugating roll, a lower corrugating roll, a gluing roll and a press roll supported on a frame and passing a sheet medium to be corrugated between said lower corrugating roll and each of said top corrugating roll, said gluing roll and said press roll, and heating means for heating each of said rolls, the improvement comprising:

means for adjusting the distance between centers of support shafts of said lower corrugating roll and least one of said top corrugating roll, said gluing roll and said press roll;

sensor means for detecting the expansion of said frame caused by transfer of heat from said rolls by detecting the initiation of operation of said heating means; and means for actuating said means for adjusting in response to the detection of expansion by said sensor means in order to compensate for said expansion of said frame by maintaining the distance between said centers of support shafts constant.

5. A single facer according to claim 4, wherein said means for adjusting comprises:

cam means in contact with a support shaft of at least one of said rolls for adjusting the position of said at least one of said rolls relative to an adjacent roll according to the position angle of said cam means;

lever means for rotating said cam means to a desired angular position; and means for moving said lever means in response to operation of said means for actuating.

6. A single facer according to claim 5, wherein said means for moving comprises an inclined slider mounted to an adjustment rod, said means for actuating comprises a motor operable in response to said sensor means, said adjustment rod being movable in an axial direction by rotation of said motor to cause said inclined slider to engage said lever means and thereby rotate said cam means to said desired angular position.

* * * * *

UNITED STATES PATENT AND TRADEMARK OFFICE
CERTIFICATE OF CORRECTION

PATENT NO. : 5,116,448

DATED : May 26, 1992

INVENTOR(S) : Murayama et al.

It is certified that error appears in the above-identified patent and that said Letters Patent is hereby corrected as shown below:

On title page, item [54] line 1, and col. 1, line 1, delete "FACTER" and insert --FACER--

Column 1, line 22, after "teeth", insert --la--.

Column 2, line 58, delete "steams" and insert --steam--.

Column 3, line 13, delete "clasping" and insert --elapsing--.

Signed and Sealed this

Sixteenth Day of November, 1993

Attest:

BRUCE LEHMAN

Attesting Officer

Commissioner of Patents and Trademarks